(12) United States Patent
Aloni et al.

(10) Patent No.: US 8,064,459 B2
(45) Date of Patent: *Nov. 22, 2011

(54) METHOD AND SYSTEM FOR TRANSPARENT TCP OFFLOAD WITH TRANSMIT AND RECEIVE COUPLING

(75) Inventors: Eliezer Aloni, Zur Yigal (IL); Rafi Shalom, Givat Shmuel (IL); Shay Mizrachi, Hod HaSharon (IL); Dov Hirshfeld, Givat Shmuel (IL); Aviv Greenberg, Netanya (IL); Assaf Grunfeld, Hod Hasharon (IL); Eliezer Tamir, Beit Shemesh (IL); Guy Corem, Herzlia (IL); Ori Hanegbi, Herzlia (IL)

(73) Assignee: Broadcom Israel Research Ltd., Ramat Gan (IL)

( * ) Notice: Subject to any disclaimer, the term of this patent is extended or adjusted under 35 U.S.C. 154(b) by 1273 days.

This patent is subject to a terminal disclaimer.

(21) Appl. No.: 11/489,078

(22) Filed: Jul. 18, 2006

(65) Prior Publication Data

US 2008/0310420 A1 Dec. 18, 2008

Related U.S. Application Data

(60) Provisional application No. 60/700,544, filed on Jul. 18, 2005.

(51) Int. Cl.
*H04L 12/28* (2006.01)
(52) U.S. Cl. ........ 370/394; 370/469; 370/471; 709/233; 709/239
(58) Field of Classification Search .................. 370/389, 370/395.52
See application file for complete search history.

(56) References Cited

U.S. PATENT DOCUMENTS

| 5,778,414 | A | 7/1998 | Winter et al. |
| 6,021,507 | A * | 2/2000 | Chen ................................. 714/2 |
| 7,420,991 | B2 * | 9/2008 | Lok et al. ...................... 370/474 |

(Continued)

FOREIGN PATENT DOCUMENTS

WO 01/13590 A 2/2001

(Continued)

OTHER PUBLICATIONS

International Search Report corresponding to International Appln. No. PCT/IB2006/004098, mailed Oct. 9, 2007, 4 pages.
International Search Report corresponding to International Appln. No. PCT/US2004/016510, mailed Oct. 25, 2004, 3 pages.

*Primary Examiner* — Seema S Rao
*Assistant Examiner* — Henry Baron
(74) *Attorney, Agent, or Firm* — McAndrews, Held & Malloy, Ltd.

(57) ABSTRACT

Certain aspects of a method and system for transparent transmission control protocol (TCP) offload with transmit and receive coupling are disclosed. Aspects of a method may include collecting at least one received TCP segment for a determined network flow via a network interface card (NIC) processor. The state information for the received TCP segment and state information for transmitted TCP segments for the determined network flow may be stored at the NIC without transferring state information for the received TCP segment and the state information for the transmitted TCP segments to a host system communicatively coupled to the NIC. A new TCP segment comprising the collected TCP segments may be generated after a termination event occurs. The generated new TCP segment, new state information for the generated new TCP segment, and the state information for the transmitted TCP segments may be communicated to the host system for TCP offload.

22 Claims, 11 Drawing Sheets

U.S. PATENT DOCUMENTS

| | | |
|---|---|---|
| 2001/0004354 A1 | 6/2001 | Jolitz |
| 2001/0012288 A1 | 8/2001 | Yu |
| 2005/0086349 A1* | 4/2005 | Subramaniyan ............... 709/230 |
| 2006/0098653 A1* | 5/2006 | Adams et al. .................. 370/389 |
| 2007/0288828 A1* | 12/2007 | Biran et al. .................... 714/758 |

FOREIGN PATENT DOCUMENTS

| | | |
|---|---|---|
| WO | 03/021436 A2 | 3/2003 |
| WO | 2004/021150 A2 | 3/2004 |
| WO | 2004/112350 A1 | 12/2004 |

* cited by examiner

METHOD AND SYSTEM FOR TRANSPARENT TCP OFFLOAD WITH TRANSMIT AND RECEIVE COUPLING

CROSS-REFERENCE TO RELATED APPLICATIONS/INCORPORATION BY REFERENCE

This patent application makes reference to, claims priority to and claims benefit from U.S. Provisional Patent Application Ser. No. 60/700,544, filed on Jul. 18, 2005.

This application also makes reference to:
U.S. application Ser. No. 11/489,388 filed Jul. 18, 2006, issued as U.S. Pat. No. 7,684,344 on Mar. 23, 2010;
U.S. application Ser. No. 11/489,407 filed Jul. 18, 2006;
U.S. application Ser. No. 11/489,300 filed Jul. 18, 2006, issued as U.S. Pat. No. 7,596,628 on Sep. 29, 2009;
U.S. application Ser. No. 11/489,393 on Jul. 18, 2006;
U.S. application Ser. No. 11/489,390 filed Jul. 18, 2006; and
U.S. application Ser. No. 11/489,389 on Jul. 18, 2006.

Each of the above referenced applications is hereby incorporated herein by reference in their entirety.

FIELD OF THE INVENTION

Certain embodiments of the invention relate to processing of TCP data and related TCP information. More specifically, certain embodiments of the invention relate to a method and system for transparent TCP offload with transmit and receive coupling.

BACKGROUND OF THE INVENTION

There are different approaches for reducing the processing power of TCP/IP stack processing. In a TCP Offload Engine (TOE), the offloading engine performs all or most of the TCP processing, presenting to the upper layer a stream of data. There may be various disadvantages to this approach. The TTOE is tightly coupled with the operating system and therefore requires solutions that are dependent on the operating system and may require changes in the operating system to support it. The TTOE may require a side by side stack solution, requiring some kind of manual configuration, either by the application, for example, by explicitly specifying a socket address family for accelerated connections. The TTOE may also require some kind of manual configuration by an IT administrator, for example, by explicitly specifying an IP subnet address for accelerated connections to select which of the TCP flows will be offloaded and the offload engine is very complex as it needs to implement TCP packet processing.

Large segment offload (LSO)/transmit segment offload (TSO) may be utilized to reduce the required host processing power by reducing the transmit packet processing. In this approach the host sends to the NIC, bigger transmit units than the maximum transmission unit (MTU) and the NIC cuts them to segments according to the MTU. Since part of the host processing is linear to the number of transmitted units, this reduces the required host processing power. While being efficient in reducing the transmit packet processing, LSO does not help with receive packet processing. In addition, for each single large transmit unit sent by the host, the host would receive from the far end multiple ACKs, one for each MTU-sized segment. The multiple ACKs require consumption of scarce and expensive bandwidth, thereby reducing throughput and efficiency.

In large receive offload (LRO), a stateless receive offload mechanism, the TCP flows may be split to multiple hardware queues, according to a hash function that guarantees that a specific TCP flow would always be directed into the same hardware queue. For each hardware queue, the mechanism takes advantage of interrupt coalescing to scan the queue and aggregate subsequent packets on the queue belonging to the same TCP flow into a single large receive unit.

While this mechanism does not require any additional hardware from the NIC besides multiple hardware queues, it may have various performance limitations. For example, if the number of flows were larger than the number of hardware queues, multiple flows would fall into the same queue, resulting in no LRO aggregation for that queue. If the number of flows is larger than twice the number of hardware queues, no LRO aggregation is performed on any of the flows. The aggregation may be limited to the amount of packets available to the host in one interrupt period. If the interrupt period is short, and the number of flows is not small, the number of packets that are available to the host CPU for aggregation on each flow may be small, resulting in limited or no LRO aggregation, even if the number of hardware queues is large. The LRO aggregation may be performed on the host CPU, resulting in additional processing. The driver may deliver to the TCP stack a linked list of buffers comprising of a header buffer followed by a series of data buffers, which may require more processing than in the case where all the data is contiguously delivered on one buffer.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for transparent TCP offload with transmit and receive coupling, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for transparent TCP offload with transmit and receive coupling. Aspects of the method and system may comprise collecting at least one received TCP segment for a determined network flow via a network interface card (NIC) processor. The state information for the received TCP segment and state information for transmitted TCP segments for the determined network flow may be stored at the NIC without transferring state information for the received TCP segment and the state information for the transmitted TCP segments to a host system communicatively coupled to the NIC. A new TCP segment comprising the collected TCP segments may be generated after a termination event occurs. The generated new TCP segment, new state information for the generated new TCP segment, and the state information for the transmitted TCP segments may be communicated to the host system for TCP offload.

During conventional TCP processing, each of the plurality of TCP segments received would have to be individually processed by a host processor in the host system. TCP processing requires extensive CPU processing power in terms of both protocol processing and data placement on the receiver side. Current processing systems and methods involve the transfer of TCP state to a dedicated hardware such as a NIC, where significant changes to host TCP stack and/or underlying hardware are required.

Figure 1A:
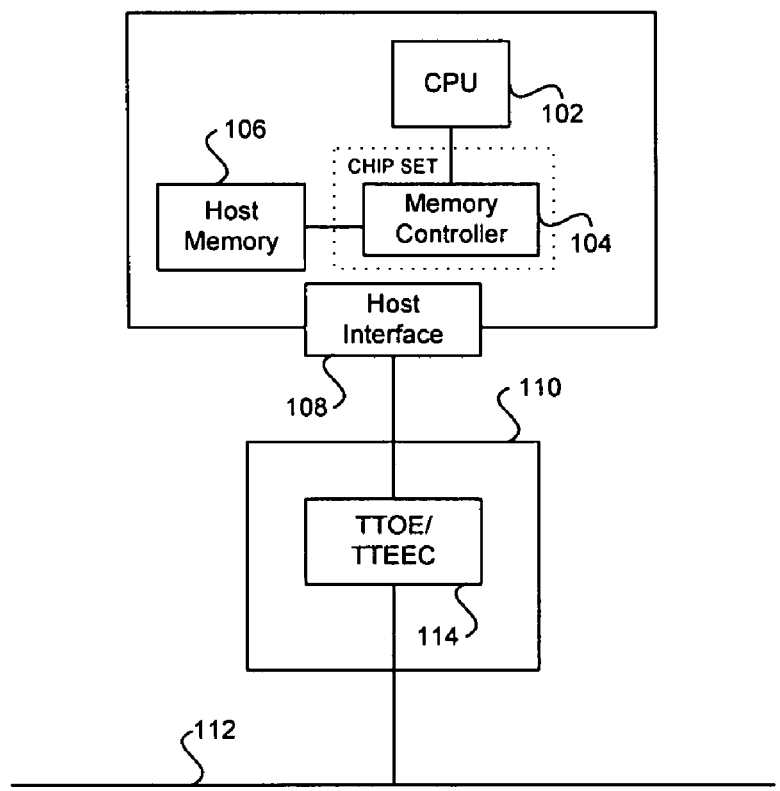
FIG. 1A is a block diagram of an exemplary system for transparent TCP offload with transmit and receive coupling, in accordance with an embodiment of the invention.

FIG. 1A is a block diagram of an exemplary system for transparent TCP offload, in accordance with an embodiment of the invention. Accordingly, the system of FIG. 1A may be adapted to handle transparent TCP offload of transmission control protocol (TCP) datagrams or packets. Referring to FIG. 1A, the system may comprise, for example, a CPU 102, a memory controller 104, a host memory 106, a host interface 108, network subsystem 110 and an Ethernet 112. The network subsystem 110 may comprise, for example, a transparent TCP-enabled Ethernet Controller (TTEEC) or a transparent TCP offload engine (TTOE) 114. The network subsystem 110 may comprise, for example, a network interface card (NIC). The host interface 108 may be, for example, a peripheral component interconnect (PCI), PCI-X, PCI-Express, ISA, SCSI or other type of bus. The memory controller 106 may be coupled to the CPU 104, to the memory 106 and to the host interface 108. The host interface 108 may be coupled to the network subsystem 110 via the TTEEC/TTOE 114.

Figure 1B:
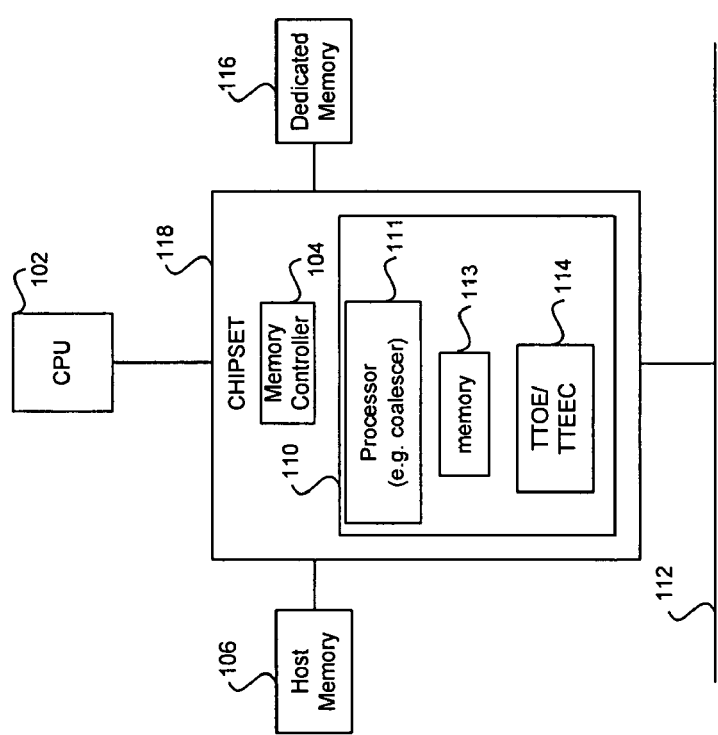
FIG. 1B is a block diagram of another exemplary system for transparent TCP offload with transmit and receive coupling, in accordance with an embodiment of the invention.

FIG. 1B is a block diagram of another exemplary system for transparent TCP offload, in accordance with an embodiment of the invention. Referring to FIG. 1B, the system may comprise, for example, a CPU 102, a host memory 106, a dedicated memory 116 and a chip set 118. The chip set 118 may comprise, for example, the network subsystem 110 and the memory controller 104. The chip set 118 may be coupled to the CPU 102, to the host memory 106, to the dedicated memory 116 and to the Ethernet 112. The network subsystem 110 of the chip set 118 may be coupled to the Ethernet 112. The network subsystem 110 may comprise, for example, the TTEEC/TTOE 114 that may be coupled to the Ethernet 112. The network subsystem 110 may communicate to the Ethernet 112 via a wired and/or a wireless connection, for example. The wireless connection may be a wireless local area network (WLAN) connection as supported by the IEEE 802.11 standards, for example. The network subsystem 110 may also comprise, for example, an on-chip memory 113. The dedicated memory 116 may provide buffers for context and/or data.

The network subsystem 110 may comprise a processor such as a coalescer 111. The coalescer 111 may comprise suitable logic, circuitry and/or code that may be enabled to handle the accumulation or coalescing of TCP data. In this regard, the coalescer 111 may utilize a flow lookup table (FLT) to maintain information regarding current network flows for which TCP segments are being collected for aggregation. The FLT may be stored in, for example, the network subsystem 110. The FLT may comprise at least one of the following: a source IP address, a destination IP address, a source TCP address, a destination TCP address, for example. In an alternative embodiment of the invention, at least two different tables may be utilized, for example, a table comprising a 4-tuple lookup to classify incoming packets according to their flow. The 4-tuple lookup table may comprise at least one of the following: a source IP address, a destination IP address, a source TCP address, a destination TCP address, for example. A flow context table may comprise state variables utilized for aggregation such as TCP sequence numbers.

The FLT may also comprise at least one of a host buffer or memory address including a scatter-gather-list (SGL) for non-continuous memory, a cumulative acknowledgments (ACKs), a copy of a TCP header and options, a copy of an IP header and options, a copy of an Ethernet header, and/or accumulated TCP flags, for example. The coalescer 111 may be enabled to generate a single aggregated TCP segment from the accumulated or collected TCP segments when a termination event occurs. The single aggregated TCP segment may be communicated to the host memory 106, for example.

Although illustrated, for example, as a CPU and an Ethernet, the present invention need not be so limited to such examples and may employ, for example, any type of processor and any type of data link layer or physical media, respectively. Accordingly, although illustrated as coupled to the Ethernet 112, the TTEEC or the TTOE 114 of FIG. 1A may be adapted for any type of data link layer or physical media. Furthermore, the present invention also contemplates different degrees of integration and separation between the components illustrated in FIGS. 1A-B. For example, the TTEEC/TTOE 114 may be a separate integrated chip from the chip set 118 embedded on a motherboard or may be embedded in a NIC. Similarly, the coalescer 111 may be a separate integrated chip from the chip set 118 embedded on a motherboard or may be embedded in a NIC. In addition, the dedicated memory 116 may be integrated with the chip set 118 or may be integrated with the network subsystem 110 of FIG. 1B.

Figure 1C:
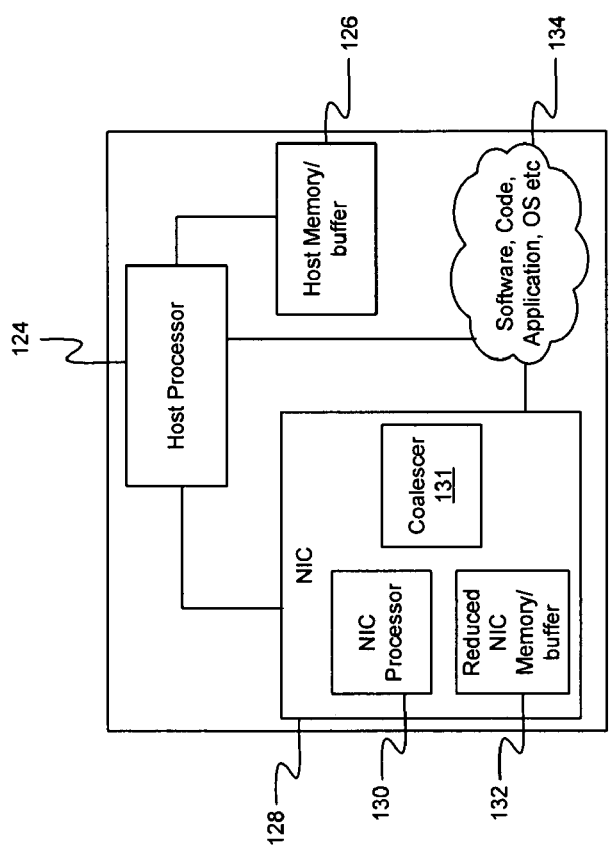
FIG. 1C is an alternative embodiment of an exemplary system for transparent TCP offload with transmit and receive coupling, in accordance with an embodiment of the invention.

FIG. 1C is an alternative embodiment of an exemplary system for transparent TCP offload, in accordance with an embodiment of the invention. Referring to FIG. 1C, there is shown a host processor 124, a host memory/buffer 126, a software algorithm block 134 and a NIC block 128. The NIC block 128 may comprise a NIC processor 130, a processor such as a coalescer 131 and a reduced NIC memory/buffer block 132. The NIC block 128 may communicate with an external network via a wired and/or a wireless connection, for example. The wireless connection may be a wireless local area network (WLAN) connection as supported by the IEEE 802.11 standards, for example.

The coalescer 131 may be a dedicated processor or hardware state machine that may reside in the packet-receiving path. The host TCP stack may comprise software that enables management of the TCP protocol processing and may be part of an operating system, such as Microsoft Windows or Linux. The coalescer 131 may comprise suitable logic, circuitry and/or code that may enable accumulation or coalescing of TCP data. In this regard, the coalescer 131 may utilize a flow lookup table (FLT) to maintain information regarding current network flows for which TCP segments are being collected for aggregation. The FLT may be stored in for example, the reduced NIC memory/buffer block 132. The coalescer 131 may enable generation of a single aggregated TCP segment from the accumulated or collected TCP segments when a termination event occurs. The single aggregated TCP segment may be communicated to the host memory/buffer 126, for example.

In accordance with certain embodiments of the invention, providing a single aggregated TCP segment to the host for TCP processing significantly reduces overhead processing by the host 124. Furthermore, since there is no transfer of TCP state information, dedicated hardware such as a NIC 128 may assist with the processing of received TCP segments by coalescing or aggregating multiple received TCP segments so as to reduce per-packet processing overhead.

In conventional TCP processing systems, it is necessary to know certain information about a TCP connection prior to arrival of a first segment for that TCP connection. In accordance with various embodiments of the invention, it is not necessary to know about the TCP connection prior to arrival of the first TCP segment since the TCP state or context information is still solely managed by the host TCP stack and there is no transfer of state information between the hardware stack and the software stack at any given time.

In an embodiment of the invention, an offload mechanism may be provided that is stateless from the host stack perspective, while state-full from the offload device perspective, achieving comparable performance gain when compared to TTOE. Transparent TCP offload (TTO) reduces the host processing power required for TCP by allowing the host system to process both receive and transmit data units that are bigger than a MTU. In an exemplary embodiment of the invention, 64 KB of processing data units (PDUs) may be processed rather than 1.5 KB PDUs in order to produce a significant reduction in the packet rate, thus reducing the host processing power for packet processing.

In TTO, no handshake may be utilized between the host operating system and the NIC containing the TTO engine. The TTO engine may operate autonomously in identifying new flows and for offloading. The offload on the transmit side may be similar to LSO, where the host sends big transmission units and the TTO engine cuts them to smaller transmitted packets according to maximum segment size (MSS).

Transparent TCP offload on the receive side may be performed by aggregating a plurality of received packets of the same flow and delivering them to the host as if they were received in one packet—one bigger packet in the case of received data packets, and one aggregate ACK packet in the case of received ACK packets. The processing in the host may be similar to the processing of a big packet that was received. In the case of TCP flow aggregation, rules may be defined to determine whether to aggregate packets. The aggregation rules may be established to allow as much aggregation as possible, without increasing the round trip time such that the decision whether to aggregate depends on the data that is received and the importance of delivering it to the host without delay. The aggregation may be implemented with transmit-receive coupling, wherein the transmitter and receiver are coupled, by utilizing transmission information for offload decisions, and the flow may be treated as a bidirectional flow. The context information of the receive offload in TTO may be maintained per flow. In this regard, for every received packet, the incoming packet header may be utilized to detect the flow it belongs to and this packet updates the context of the flow.

When the transmitter and receiver are coupled, the transmitted network packets may be searched along with the received network packets to determine the particular network flow to which the packet belongs. The transmitted network packet may enable updating of the context of the flow, which may be utilized for receive offload.

Figure 1D:
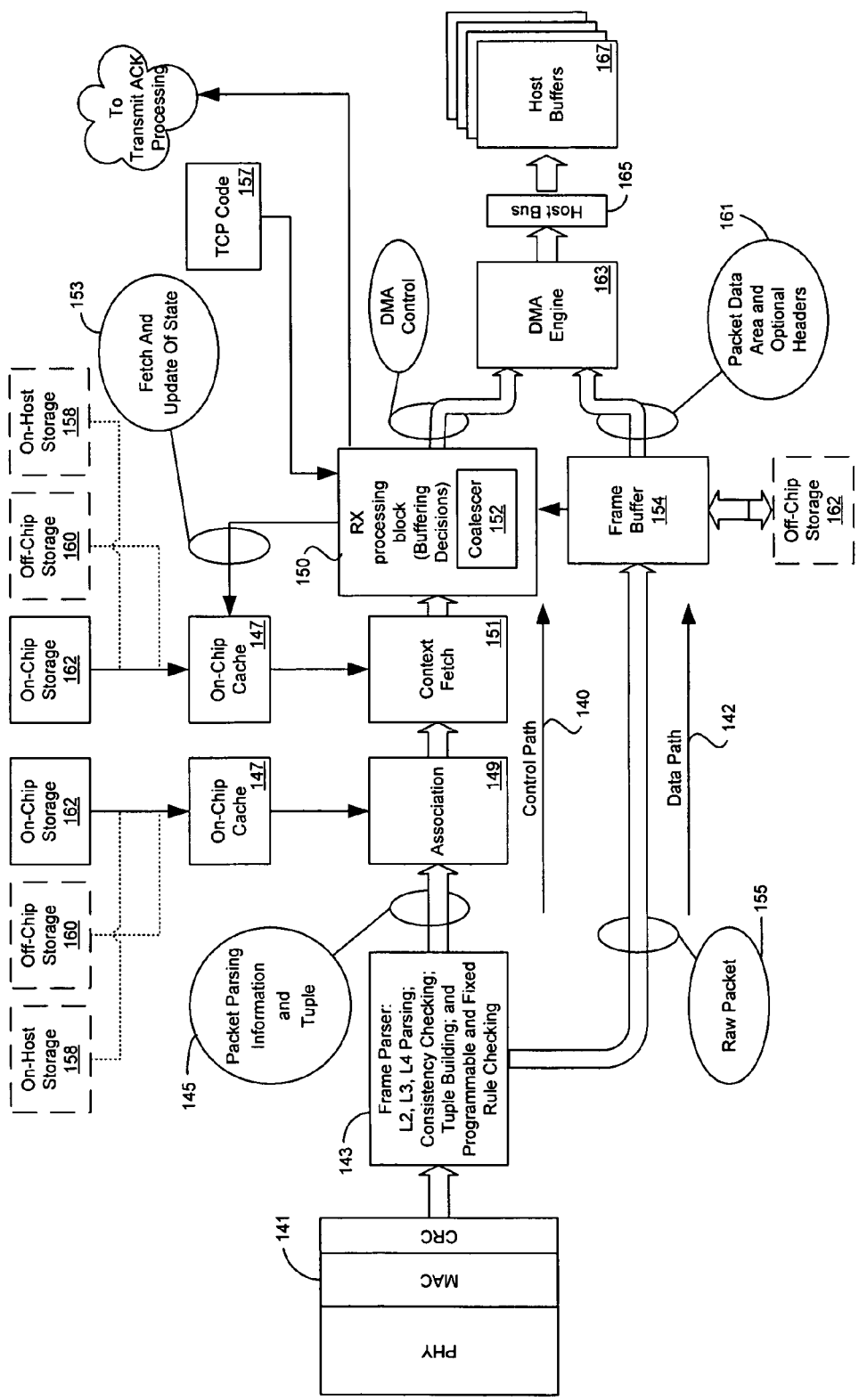
FIG. 1D is a block diagram of a system for handling transparent TCP offload with transmit and receive coupling, in accordance with an embodiment of the invention.

FIG. 1D is a block diagram of a system for handling transparent TCP offload, in accordance with an embodiment of the invention. Referring to FIG. 1D, there is shown an incoming packet frame 141, a frame parser 143, an association block 149, a context fetch block 151, a plurality of on-chip cache blocks 147, a plurality of off-chip storage blocks 160, a plurality of on-chip storage blocks 162, a RX processing block 150, a frame buffer 154, a DMA engine 163, a TCP code block 157, a host bus 165, and a plurality of host buffers 167. The RX processing block 150 may comprise a coalescer 152.

The frame parser 143 may comprise suitable logic, circuitry and/or code that may enable L2 Ethernet processing including, for example, address filtering, frame validity and error detection of the incoming frames 141. Unlike an ordinary Ethernet controller, the next stage of processing may comprise, for example, L3 such as IP processing and L4 such as TCP processing within the frame parser 143. The TTEEC 114 may reduce the host CPU 102 utilization and memory bandwidth, for example, by processing traffic on coalesced TCP/IP flows. The TTEEC 114 may detect, for example, the protocol to which incoming packets belong based on the packet parsing information and tuple 145. If the protocol is TCP, then the TTEEC 114 may detect whether the packet corresponds to an offloaded TCP flow, for example, a flow for which at least some TCP state information may be kept by the TTEEC 114. If the packet corresponds to an offloaded connection, then the TTEEC 114 may direct data movement of the data payload portion of the frame. The destination of the payload data may be determined from the flow state information in combination with direction information within the frame. The destination may be a host memory 106, for example. Finally, the TTEEC 114 may update its internal TCP and higher levels of flow state, without any coordination with the state of the connection on the host TCP stack, and may obtain the host buffer address and length from its internal flow state.

The receive system architecture may comprise, for example, a control path processing 140 and data movement engine 142. The system components above the control path as illustrated in upper portion of FIG. 1D, may be designed to deal with the various processing stages used to complete, for example, the L3/L4 or higher processing with maximal flexibility and efficiency and targeting wire speed. The result of the stages of processing may comprise, for example, one or more packet identification cards that may provide a control structure that may carry information associated with the frame payload data. This may have been generated inside the TTEEC 114 while processing the packet in the various blocks. A data path 142 may move the payload data portions or raw packets 155 of a frame along from, for example, an on-chip packet frame buffer 154 and upon control processing completion, to a direct memory access (DMA) engine 163 and subsequently to the host buffer 167 via the host bus 165 that was chosen via processing. The data path 142 to the DMA engine may comprise packet data are and optional headers 161.

The receiving system may perform, for example, one or more of the following: parsing the TCP/IP headers 145; associating the frame with a TCP/IP flow in the association block 149; fetching the TCP flow context in the context fetch block 151; processing the TCP/IP headers in the RX processing block 150; determining header/data boundaries and updating state 153; mapping the data to a host buffers; and transferring the data via a DMA engine 163 into these host buffers 167. The headers may be consumed on chip or transferred to the host buffers 167 via the DMA engine 163.

The packet frame buffer 154 may be an optional block in the receive system architecture. It may be utilized for the same purpose as, for example, a first-in-first-out (FIFO) data structure is used in a conventional L2 NIC or for storing higher layer traffic for additional processing. The packet frame buffer 154 in the receive system may not be limited to a single instance. As control path 140 processing is performed, the data path 142 may store the data between data processing stages one or more times.

In an exemplary embodiment of the invention, at least a portion of the coalescing operations described for the coalescer 111 in FIG. 1B and/or for the coalescer 131 in FIG. 1C may be implemented in a coalescer 152 in the RX processing block 150 in FIG. 1D. In this instance, buffering or storage of TCP data may be performed by, for example, the frame buffer 154. Moreover, the FLT utilized by the coalescer 152 may be implemented using the off-chip storage 160 and/or the on-chip storage 162, for example.

In an embodiment of the invention, a new flow may be detected at some point during the flow lifetime. The flow state is unknown when the new flow is detected and the first packets are utilized to update the flow state until the flow is known to be in-order. A device performing TTO may also support other offload types, for example, TOE, RDMA, or iSCSI offload. In this case, the FLT for TTO may be shared with the connection search for other offload types with each entry in the FLT indicating the offload type for that flow. Packets that belong to flows of other offload types may not be candidates for TTO. Upon detecting a new flow, the flow may be initiated with the basic initialization context. An entry in the FLT with a flow ID may be created.

In another embodiment of the invention, a plurality of segments of the same flow may be aggregated in TTO up to a receive aggregation length (RAL), presenting to the host a bigger segment for processing. If aggregation is allowed, the received packet may be placed in the host memory 126 but will not be delivered to the host. Instead, the host processor 124 may update the context of the flow this packet belongs to. The new incoming packet may either cause the packet to be delivered immediately alone if there were no prior aggregated packets that were not delivered or as a single packet that represents both that packet and the previously received packets. In another embodiment of the invention, the packet may not be delivered but may update the flow's context.

A termination event may occur and the packet may not be aggregated if at least one of the following occurs at the TCP level: (1) the data is not in-order as derived from the received sequence number (SN) and the flow's context; (2) at least one packet with TCP flags other than ACK flag, for example, a PUSH flag is detected; (3) at least one packet with selective acknowledgement (SACK) information is detected; or (4) if the ACK SN received is bigger than the delivered ACK SN, and requires stopping the aggregation. Similarly, a termination event may occur and the packet may not be aggregated if at least one of the following occurs at the IP level: (1) the type of service (TOS) field in the IP header is different than the TOS field of the previous packets that were aggregated; or (2) the received packet is an IP fragment.

When aggregating a plurality of packets to a single packet, the aggregated packet's header may contain the aggregated header of all the individual packets it contains. In an exemplary embodiment of the invention, a plurality of TCP rules for the aggregation may be as follows. For example, (1) the SN in the aggregated header is the SN of the first or oldest packet; (2) the ACK SN is the SN of the last or youngest segment; (3) the length of the aggregated header is the sum of the lengths of all the aggregated packets; (4) the window in the aggregated header is the window received in the last or youngest aggregated packet; (5) the time stamp (TS) in the aggregated header is the TS received in the first or oldest aggregated packet; (6) the TS-echo in the aggregated header is the TS-echo received in the first or oldest aggregated packet; and (7) the checksum in the aggregated header is the accumulated checksum of all aggregated packets.

In an exemplary embodiment of the invention, a plurality of IP field aggregation rules may be provided. For example, (1) the TOS of the aggregated header may be that of all the aggregated packets; (2) the time-to-live (TTL) of the aggregated header is the minimum of all incoming TTLs; (3) the length of the aggregated header is the sum of the lengths in the aggregated packets; (4) the fragment offset of the aggregated header may be zero for aggregated packets; and (5) the packet ID of the aggregated header is the last ID received.

The received packets may be aggregated until the received packet cannot be aggregated due to the occurrence of a termination event, or if a timeout has expired on that flow, or if the aggregated packet exceeds RAL. The timeout may be implemented by setting a timeout to a value, timeout aggregation value, when the first packet on a flow is placed without delivery. The following packets that are aggregated may not change the timeout. When the packets are delivered due to timeout expiration the timeout may be canceled and may be set again in the next first packet that is not delivered. Notwithstanding, other embodiments of the invention may provide timeout implementation by periodically scanning all the flows.

In an exemplary embodiment of the invention, the received ACK SN may be relevant to determine the rules to aggregate pure ACKs and to determine the rules to stop aggregation of packets with data due to the received ACK SN. The duplicated pure ACKs may never be aggregated. When duplicated pure ACKs are received, they may cause prior aggregated packets to be delivered and the pure ACK may be delivered immediately separately. The received ACK SN may also be utilized to stop the aggregation and deliver the pending aggregated packet to the host TCP/IP stack.

In an exemplary embodiment of the invention, a plurality of rules may be provided for stopping the aggregation according to the ACK SN. For example, (1) if the number of acknowledged (ACKed) bytes that are not yet delivered, taking into account the received segments and the prior segments that were not delivered exceeds a threshold, ReceiveAckedBytesAggretation, for example, in bytes; or (2) the time from the arrival of the first packet that advanced the received ACK SN exceeds a threshold, TimeoutAckAggregation, for example. For this purpose, a second timer per flow may be required or other mechanisms, such as periodically scanning the flows may be implemented.

In another exemplary embodiment of the invention, the flows may be removed from the host memory if one of the following occurs: (1) a reset (RST) flag was detected in the receive side; (2) a finish (FIN) flag was detected in the receive side; (3) there was no receive activity on the flow for a predefined time TerminateNoActivityTime, for example; (4) a KeepAlive packet in the receive direction was not acknowledged. A least recently used (LRU) cache may be used instead of a timeout rule to remove the flows from the host memory.

In another exemplary embodiment of the invention, the flows may be removed from the host memory if the flow was closed due to a retransmission timeout that requires information from the transmitter. In one exemplary embodiment of the invention, retransmission timeout may comprise periodically scanning all the flows to determine if any flow is closed. The period for scanning may be low, for example, 5 seconds. In each scan, if there is unacknowledged data that was transmitted by the NIC 128 the maximum transmitted sequence number (SN) may be recorded. Additionally, if there is unacknowledged data that was transmitted by the peer side, the maximum received SN may be recorded. If in two consequent scans there is pending data on same flow of the same type with the recorded number unchanged, pending data that was not acknowledged for the entire scan period may be indicated. In this case the flow may be removed.

Figure 1E:
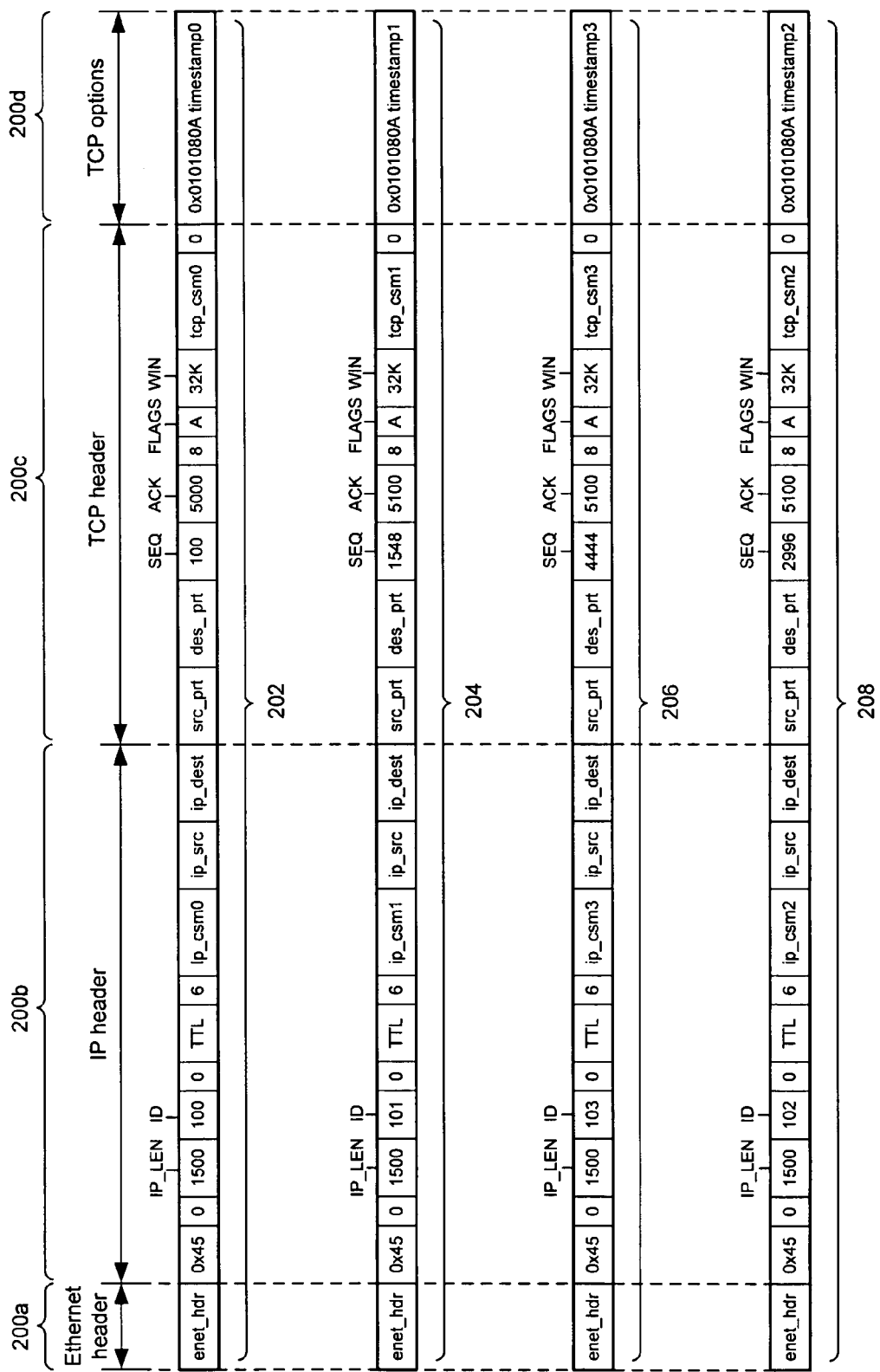
FIG. 1E illustrates an exemplary sequence of TCP/IP frames to be aggregated and not received in order, in accordance with an embodiment of the invention.

FIG. 1E illustrates an exemplary sequence of TCP/IP frames to be aggregated and not received in order, in accordance with an embodiment of the invention. Referring to FIG. 1E, there are shown a first TCP/IP frame 202, a second TCP/IP frame 204, a third TCP/IP frame 206, and a fourth TCP/IP frame 208. Each TCP/IP frame shown may comprise an Ethernet header 200*a*, an IP header 200*b*, a TCP header 200*c*, and a TCP options 200*d*. While not shown in FIG. 1F, each of the TCP/IP frames may comprise a payload portion that contains TCP segments comprising data being transferred. The Ethernet header 200*a* may have a value, enet_hdr, for the TCP/IP frames. The IP header 200*b* may comprise a plurality of fields. In this regard, the IP header 200*b* may comprise a field, IP_LEN, which may be utilized to indicate a number of bytes in the frames. In this example, there are 1448 TCP payload packets in each of the first TCP/IP frame 202, the second TCP/IP frame 204, the third TCP/IP frame 206, and the fourth TCP/IP frame 208.

The IP header 200*b* may also comprise an identification field, ID, which may be utilized to identify the frame, for example. In this example, ID=100 for the first TCP/IP frame 202, ID=101 for the second TCP/IP frame 204, ID=103 for the third TCP/IP frame 206, and ID=102 for the fourth TCP/IP frame 208. The IP header 200*b* may also comprise additional fields such as an IP header checksum field, ip_csm, a source field, ip_src, and a destination field, ip_dest, for example. In this example, the value of ip_src and ip_dest may be the same for all frames, while the value of the IP header checksum field may be ip_csm0 for the first TCP/IP frame 202, ip_csm1 for the second TCP/IP frame 204, ip_csm3 for the third TCP/IP frame 206, and ip_csm2 for the fourth TCP/IP frame 208.

The TCP header 200*c* may comprise a plurality of fields. For example, the TCP header 200*c* may comprise a source port field, src_prt, a destination port field, dest_prt, a TCP sequence field, SEQ, an acknowledgment field, ACK, a flags field, FLAGS, an advertised window field, WIN, and a TCP header checksum field, tcp_csm. In this example, the value of src_prt, dest_prt, FLAGS, and WIN may be the same for all frames. For the first TCP/IP frame 202, SEQ=100, ACK=5000, and the TCP header checksum field is tcp_csm0. For the second TCP/IP frame 204, SEQ=1548, ACK=5100, and the TCP header checksum field is tcp_csm1. For the third TCP/IP frame 206, SEQ=4444, ACK=5100, and the TCP header checksum field is tcp_csm3. For the fourth TCP/IP frame 208, SEQ=2996, ACK=5100, and the TCP header checksum field is tcp_csm2.

The TCP options 200*d* may comprise a plurality of fields. For example, the TCP options 200*d* may comprise a time stamp indicator, referred to as timestamp, which is associated with the TCP frame. In this example, the value of the time stamp indicator may be timestamp0 for the first TCP/IP frame 202, timestamp1 for the second TCP/IP frame 204, timestamp3 for the third TCP/IP frame 206, and timestamp2 for the fourth TCP/IP frame 208.

The exemplary sequence of TCP/IP frames shown in FIG. 1F is received out-of-order with respect to the order of transmission by the network subsystem 110, for example. Information comprised in the ID field in the IP header 200*b* and/or in the timestamp field in the TCP options 200*d* may indicate that the third TCP/IP frame 206 and the fourth TCP/IP frame 208 were received in a different order from the order of transmission. In this instance, the fourth TCP/IP frame 208 was transmitted after the second TCP/IP frame 204 and before the third TCP/IP frame 206. A coalescer, such as the coalescers described in FIGS. 1B-1E may obtain information from the TCP/IP frames and may generate a single TCP/IP frame by coalescing the information received. In this regard, the coalescer may utilize a FLT to store and/or update at least a portion of the information received from the TCP/IP frames. The coalescer may also utilize available memory to store or buffer the payload of the aggregated/IP frame.

Figure 2A:
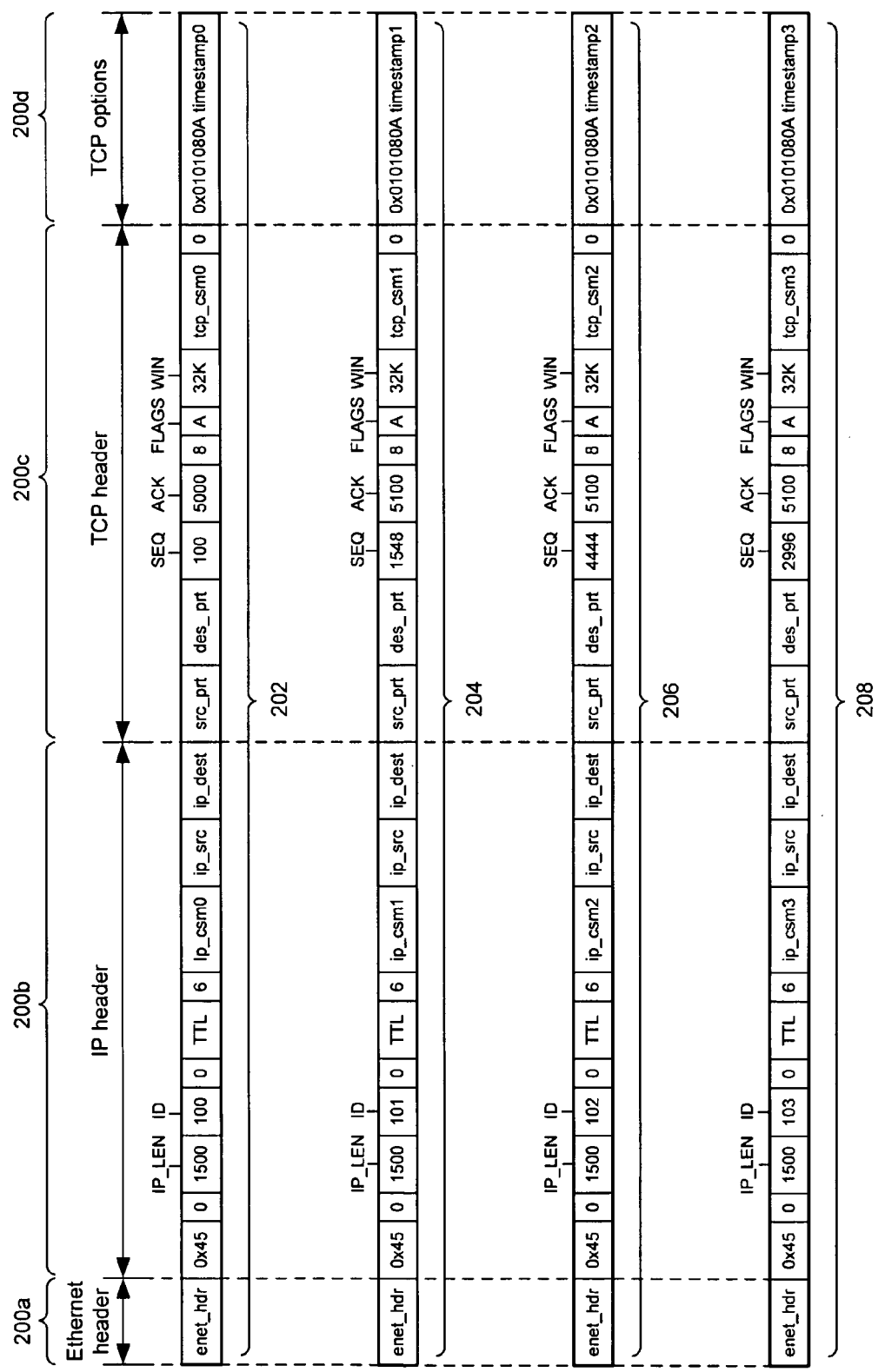
FIG. 2A illustrates an exemplary sequence of TCP/IP frames to be aggregated and received in order, in accordance with an embodiment of the invention.

FIG. 2A illustrates an exemplary sequence of TCP/IP frames to be aggregated and received in order, in accordance with an embodiment of the invention. Referring to FIG. 2A, there are shown a first TCP/IP frame 202, a second TCP/IP frame 204, a third TCP/IP frame 206, and a fourth TCP/IP frame 208. Each TCP/IP frame shown may comprise an Ethernet header 200*a*, an IP header 200*b*, a TCP header 200*c*, and a TCP options 200*d*. While not shown in FIG. 2A, each of the TCP/IP frames may comprise a payload portion that contains TCP segments comprising data being transferred. The Ethernet header 200*a* may have a value, enet_hdr, for the TCP/IP frames. The IP header 200*b* may comprise a plurality of fields. In this regard, the IP header 200*b* may comprise a field, IP_LEN, which may be utilized to indicate a number of bytes in the frames. In this example, there are 1448 TCP payload packets in each of the first TCP/IP frame 202, the second TCP/IP frame 204, the third TCP/IP frame 206, and the fourth TCP/IP frame 208.

The IP header 200*b* may also comprise an identification field, ID, which may be utilized to identify the frame, for example. In this example, ID=100 for the first TCP/IP frame 202, ID=101 for the second TCP/IP frame 204, ID=102 for the third TCP/IP frame 206, and ID=103 for the fourth TCP/IP frame 208. The IP header 200*b* may also comprise additional fields such as an IP header checksum field, ip_csm, a source field, ip_src, and a destination field, ip_dest, for example. In this example, the value of ip_src and ip_dest may be the same for all frames, while the value of the IP header checksum field may be ip_csm0 for the first TCP/IP frame 202, ip_csm1 for the second TCP/IP frame 204, ip_csm2 for the third TCP/IP frame 206, and ip_csm3 for the fourth TCP/IP frame 208.

The TCP header 200*c* may comprise a plurality of fields. For example, the TCP header 200*c* may comprise a source port field, src_prt, a destination port field, dest_prt, a TCP sequence field, SEQ, an acknowledgment field, ACK, a flags field, FLAGS, an advertised window field, WIN, and a TCP header checksum field, tcp_csm. In this example, the value of src_prt, dest_prt, FLAGS, and WIN may be the same for all frames. For the first TCP/IP frame 202, SEQ=100, ACK=5000, and the TCP header checksum field is tcp_csm0. For the second TCP/IP frame 204, SEQ=1548, ACK=5100, and the TCP header checksum field is tcp_csm1. For the third TCP/IP frame 206, SEQ=4444, ACK=5100, and the TCP header checksum field is tcp_csm2. For the fourth TCP/IP frame 208, SEQ=2996, ACK=5100, and the TCP header checksum field is tcp_csm3.

The TCP options 200*d* may comprise a plurality of fields. For example, the TCP options 200*d* may comprise a time stamp indicator, referred to as timestamp, which is associated with the TCP frame. In this example, the value of the time stamp indicator may be timestamp0 for the first TCP/IP frame 202, timestamp1 for the second TCP/IP frame 204, timestamp2 for the third TCP/IP frame 206, and timestamp3 for the fourth TCP/IP frame 208.

The exemplary sequence of TCP/IP frames shown in FIG. 2A is received in-order with respect to the order of transmission by the network subsystem 110, for example. A coalescer, such as the coalescers described in FIGS. 1B-1E may obtain information from the TCP/IP frames and may generate a single TCP/IP frame by coalescing the information received. In this regard, the coalescer may utilize a FLT to store and/or update at least a portion of the information received from the TCP/IP frames. The coalescer may also utilize available memory to store or buffer the payload of the aggregated/IP frame.

Figure 2B:
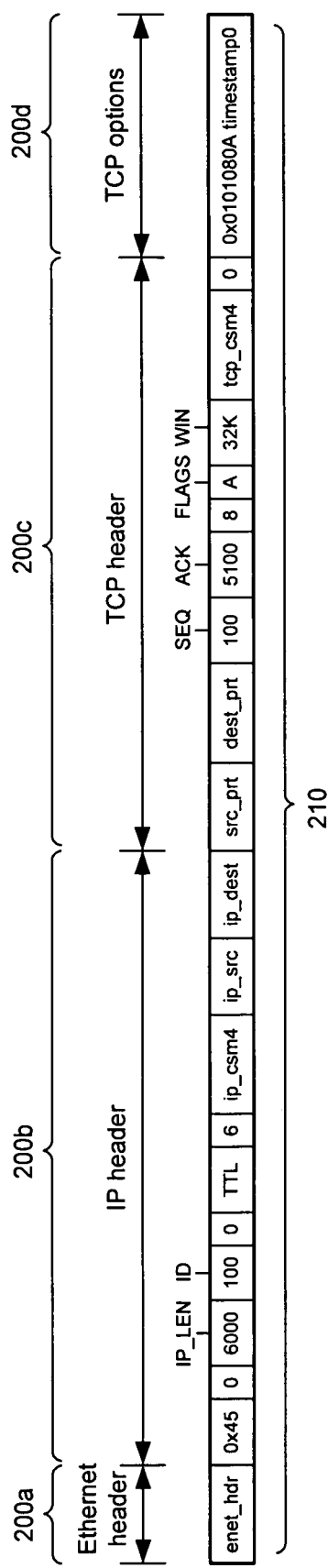
FIG. 2B illustrates an exemplary aggregated TCP/IP frame generated from information in the sequence of TCP frames in FIG. 2A, in accordance with an embodiment of the invention.

FIG. 2B illustrates an exemplary aggregated TCP/IP frame generated from information in the sequence of TCP frames in FIG. 2A, in accordance with an embodiment of the invention. Referring to FIG. 2B, there is shown a single TCP/IP frame 210 that may be generated by a coalescer from the sequence of TCP/IP frames received in FIG. 2A. The TCP/IP frame 210 may comprise an Ethernet header 200*a*, an IP header 200*b*, a TCP header 200*c*, and a TCP options 200*d*. While not shown, the TCP/IP frame 210 may also comprise a payload that contains TCP segments comprising actual data for received TCP/IP frames. The fields in the Ethernet header 200*a*, the IP header 200*b*, the TCP header 200*c*, and the TCP options 200*d* in the TCP/IP frame 210 may be substantially similar to the fields in the TCP/IP frames in FIG. 2A. For the TCP/IP frame 210, the total number of packets in the payload is IP_LEN=5844, which corresponds to the sum of the packets for all four TCP/IP frames in FIG. 2A (1448*4+52), for example. For the TCP/IP frame 210, the value of ID=100, which corresponds to the ID value of the first TCP/IP frame 202. Moreover, the value of the time stamp indicator is timestamp0, which corresponds to the time stamp indicator of the first TCP/IP frame 202. The TCP/IP frame 210 may be communicated or transferred to a host system for TCP processing, for example.

Figure 2C:
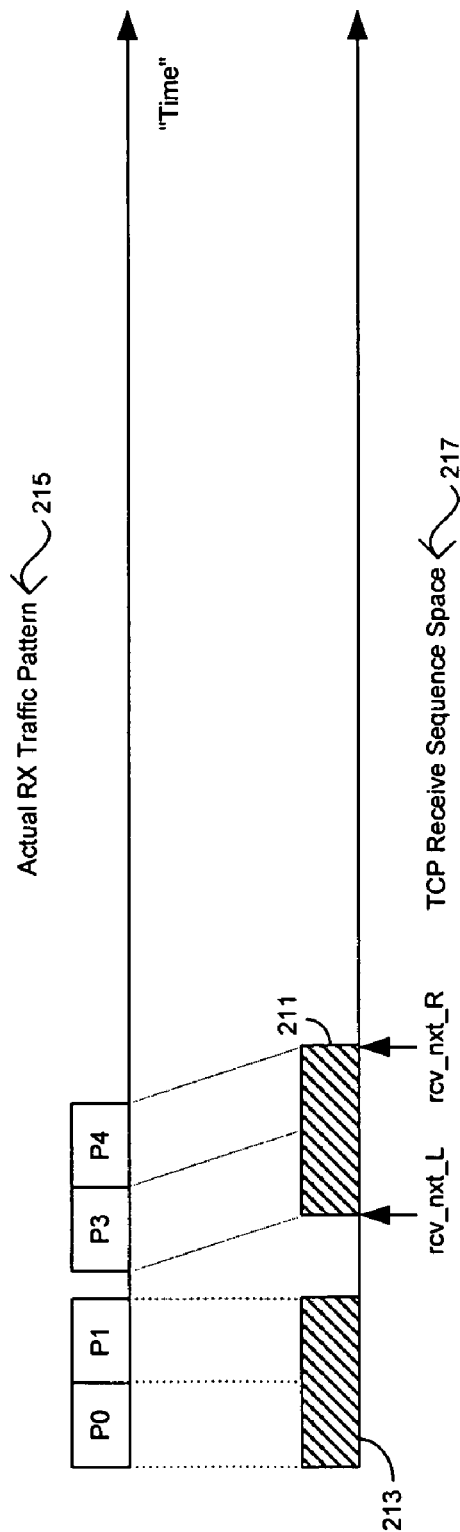
FIG. 2C is a diagram illustrating exemplary steps that may be utilized for handling out-of-order data when a packet P3 and a packet P4 arrive out-of-order with respect to the order of transmission, in accordance with an embodiment of the invention.

FIG. 2C is a diagram illustrating exemplary steps that may be utilized for handling out-of-order data when a packet P3 and a packet P4 arrive out-of-order with respect to the order of transmission, in accordance with an embodiment of the invention. Regarding FIG. 2C, the packets P3 and P4 may arrive in-order with respect to each other at the NIC 128 but before the arrival of a packet P2, as shown in the actual receive RX traffic pattern 200. The packets P3 and P4 may correspond to a fourth packet and a fifth packet within an isle 211, respectively, in a TCP transmission sequence. In this case, there is a gap or time interval between the end of the packet P1 and the beginning of the packet P3 in the actual receive RX traffic pattern 200. A first disjoint portion in the TCP transmission sequence may result from the arrival of the packets P3 and P4 as shown in the TCP receive sequence space 202 after the isle 213 comprising packets P0 and P1. The rightmost portion of isle 211 rcv_nxt_R may be represented as (rcv_nxt_L+(length of isle)), where rcv_nxt_L is the leftmost portion of isle 211 and the length of isle is the sum of the lengths of packets P3 and P4.

Figure 3:
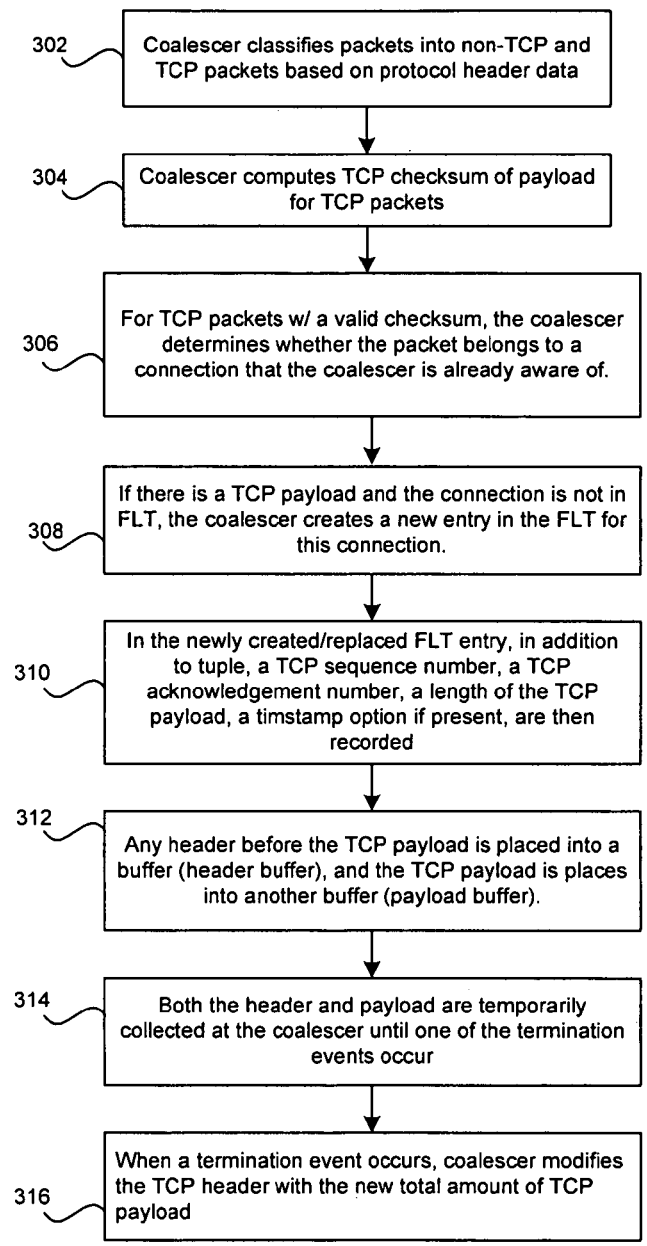
FIG. 3 is a flow chart illustrating exemplary steps for transparent TCP offload, in accordance with an embodiment of the invention.

FIG. 3 is a flow chart illustrating exemplary steps for transparent TCP offload, in accordance with an embodiment of the invention. Referring to FIG. 3, in step 302, for every packet received, the coalescer 131, for example, may classify the packets into non-TCP and TCP packets by examining the protocol headers. In step 304, the coalescer 131 may compute the TCP checksum of the payload. In step 306, for TCP packets with valid checksum, the coalescer 131 first searches the flow lookup table (FLT) using a tuple comprising IP source address, IP destination address, source TCP port and destination TCP port, to determine whether the packet belongs to a connection that the coalescer 131 is already aware of. In instances where the search fails, this packet may belong to a connection that is not known to the coalescer 131. The coalescer 131 may determine whether there is any TCP payload. If there is no TCP payload, for example, pure TCP ACK, the coalescer 131 may stop further processing and allow processing of the packet through a normal processing path and add an entry in the FLT. In step 312, if there is TCP payload and the connection is not in the FLT, the coalescer 131 may create a new entry in the FLT for this connection. In step 308, if there is TCP payload and the connection is not in the FLT, the coalescer 131 may create a new entry in the FLT for this connection. This operation may involve retiring an entry in the FLT when the FLT is full. The FLT retirement may immediately stop any further coalescing and provides an indication of any aggregated TCP segment to host TCP stack.

In step 310, if the newly created/replaced FLT entry, in addition to tuple, a TCP sequence number, a TCP acknowledgement number, a length of the TCP payload, and a timestamp option if present, may be recorded. In step 312, any header before TCP payload may be placed into a buffer (Header Buffer), whereas the TCP payload may be placed into another buffer (Payload Buffer). This information may also be kept in the FLT and a timer also started. In step 314, both the header and the payload may be temporarily collected at coalescer 131 until either one of the following exemplary termination events occur:

a. TCP flags comprising PSH or FIN or RST bits are detected on either the receive side or the transmit side.

b. An amount of TCP payload exceeds a threshold or maximum IP datagram size.

c. A timer expires.

d. A FLT table is full and one of the current network flow entries is replaced with an entry associated with a new network flow.

e. A first IP fragment containing the same tuple is detected.

f. A transmit window size changes.

g. A change in TCP acknowledgement (ACK) number exceeds an ACK threshold.

h. A number of duplicated ACK exceeds a duplicated ACK threshold.

i. A selective TCP acknowledgment (SACK).

In this regard, the PSH bit may refer to a control bit that indicates that a segment contains data that must be pushed through to the receiving user. The FIN bit may refer to a control bit that indicates that the sender will send no more data or control occupying sequence space. The RST bit may refer to a control bit that indicates a reset operation where the receiver should delete the connection without further interaction. The ACK bit may refer to a control bit that indicates that the acknowledgment field of the segment specifies the next sequence number the sender of this segment is expecting to receive, hence acknowledging receipt of all previous sequence numbers.

In step 316, when either one of these events happens, the coalescer 131 may modify the TCP header with the new total amount of TCP payload and indicates this large and single TCP segment to the normal TCP stack, along with a total number of TCP segments aggregated and/or a first timestamp option. When the large and single TCP segment reaches the host TCP stack, the host TCP stack processes it as any normal incoming frame.

The hardware stack that may be located on the NIC is adapted to take the packets off the wire and accumulate or aggregate them independent of the TCP stack running on the host processor. For example, the data portion of a plurality of received packets may be accumulated in the host memory until a single large TCP receive packet of, for example 8K is created. Once the single large TCP receive packet gets generated, it may be transferred to the host for processing. In this regard, the hardware stack may be adapted to build state and context information when it recognizes the received TCP packets. This significantly reduces the computation intensive tasks associated with TCP stack processing. While the data portion of a plurality of received packets is being accumulated in the host memory, this data remains under the control of the NIC.

Although the handling of a single TCP connection is illustrated, the invention is not limited in this regard. Accordingly, various embodiments of the invention may provide support for a plurality of TCP connections over multiple physical networking ports.

Figure 4:
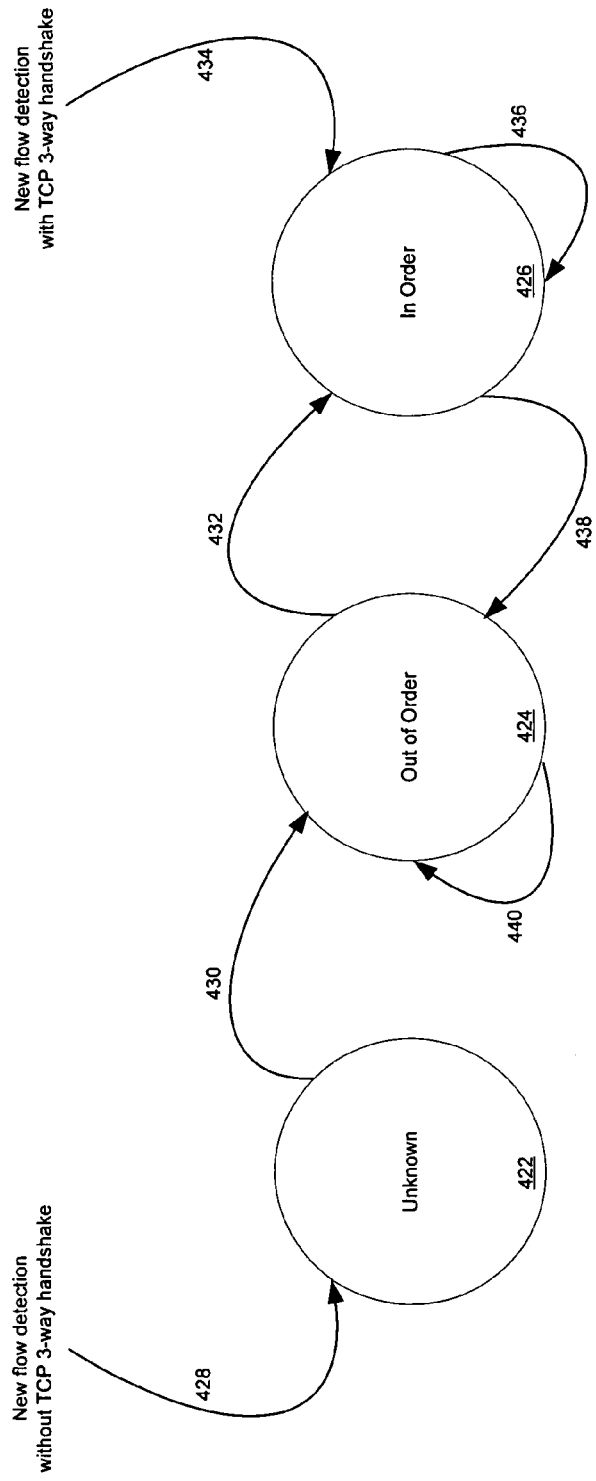
FIG. 4 is a diagram illustrating exemplary transition states for transparent TCP offload with transmit-receive coupling, in accordance with an embodiment of the invention.

FIG. 4 is a diagram illustrating exemplary transition states for transparent TCP offload with transmit-receive coupling, in accordance with an embodiment of the invention. Referring to FIG. 4, there is shown a plurality of exemplary flow states, namely, in order state 426, Out-Of-Order (OOO) state 424, or an unknown state 422. In transition state 428, the unknown state 422 may be detected for a flow for which a 3-way TCP handshake has not been detected or at some point in the life of the flow other than the initialization phase. The offload engine may also track outgoing and incoming TCP segments with a set synchronous (SYN) flag to detect a new flow. The exemplary transition states may be implemented as a state machine.

The TCP 3-way handshake begins with a synchronize (SYN) segment containing an initial send sequence number (ISN) being chosen by, and sent from a first host. This sequence number may be the starting sequence number of the data in that packet and may increment for every byte of data sent within the segment. When the second host receives the SYN with the sequence number, it may transmit a SYN segment with its own totally independent ISN number in the sequence number field along with an acknowledgment field. This acknowledgment (ACK) field may inform the recipient that its data was received at the other end and it expects the next segment of data bytes to be sent, and may be referred to as the SYN-ACK. When the first host receives this SYN-ACK segment, it may send an ACK segment containing the next sequence number, called forward acknowledgement. The second host may receive the forward acknowledgement. The ACK segment may be identified by the ACK field being set. Segments that are not acknowledged within a certain period of time may be retransmitted.

When a flow is transparent TCP offloaded, the flow may not move from the in order state 426 and OOO state 424 to the unknown state 422 unless it gets removed and detected again. In transition state 430, the state diagram may track the out-of-order isle sequence number boundaries using, for example, the parameters rcv_nxt_R and rcv_nxt_L as illustrated in FIG. 2C. The first ingress segment may be referred to as an isle, for example, isle 213 (FIG. 2C) and the ordering state may be set to OOO state 424. The rightmost portion of isle rcv_nxt_R may be represented as (rcv_nxt_L+(length of isle)), where rcv_nxt_L is the leftmost portion of isle and the length of isle is the sum of the lengths of packets in the isle.

In transition state 432, the NIC 128 may access the local stack acknowledgment information as the transmitter and receiver are coupled. The ordering state may be modified from OOO state 424 to in-order state 426 whenever an egress ACK sequence number is greater than an isle length of at least one TCP segment.

In transition state 434, the initial ordering state may be set to the in order state 426, if the new flow is detected with the TCP 3-way handshake. In transition state 436, the rcv_nxt_R may be utilized to check the condition of ingress packets according to the following algorithm.

If (in_packet_sn==rcv_nxt_R)//when isle is increased
    update rcv_nxt_L rcv_nxt_R=in_packet_sn+in_packet_len In transition state 438, the ordering state may be modified from in order state 426 to OOO state 424 if the isle length is not equal to rcv_nxt_R. The value of rcv_nxt_R may be used to check the condition of ingress packets according to the following algorithm.

If (in_packet_sn!=rcv_nxt_R)
    rcv_nxt_L=in_packet_sn
    rcv_nxt_R=in_packet_sn+in_packet_len
    change state to OOO 424.

In transition state 440, during OOO state 424, the boundaries of the highest OOO isle may be tracked for every ingress packet using the following exemplary algorithm.

If (in_packet_sn==rcv_nxt_R)//when the isle is increased
    update rcv_nxt_L rcv_nxt_R=in_packet_sn+in_packet_len
else if (in_packet_sn>rcv_nxt_R)//when a new higher isle is generated rcv_nxt_R=in_packet_sn+in_packet_len
    rcv_nxt_L=in_packet_sn In another embodiment of the invention, the number of ACKed bytes that have not yet been delivered may exceed a fraction of the pending transmitted bytes that were not ACKed. The pending transmitted bytes count may be calculated as the difference between sndMax, the most advance sequence number (SN) that was transmitted and the last received ACK SN that was delivered.

In another embodiment of the invention, the number of ACKed bytes may exceed a dynamic threshold. This threshold may depend on the size of the packets that were transmitted to the peer. The sizes of the transmitted packets or the size of the transmission units that were sent to the chip to be transmitted and were not yet ACKed may be recorded. In case of LSO, the aggregation may be set to ACK blocks of data similar to the transmitted data units.

Figure 5:
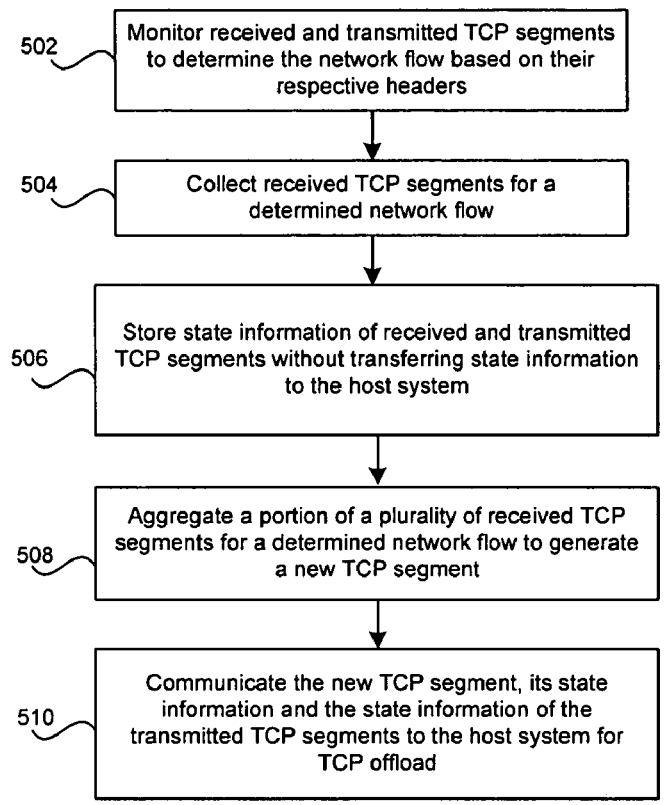
FIG. 5 is a flow chart illustrating exemplary steps for transparent TCP offload with transmit-receive coupling, in accordance with an embodiment of the invention.

FIG. 5 is a flow chart illustrating exemplary steps for transparent TCP offload with transmit-receive coupling, in accordance with an embodiment of the invention. Referring to FIG. 5, in step 502, each of the received TCP segments and the transmitted TCP segments may be monitored to determine which network flow they belong to based on their respective header information. In step 504, a network interface card (NIC) processor 130 enables collection of at least one received TCP segment for a determined network flow. In step 506, the NIC 128 enables storage of state information for the received TCP segment and state information for transmitted TCP segments for the determined network flow without transferring state information for the received TCP segment and the state information for the transmitted TCP segments to a host system 124 communicatively coupled to the NIC 128. In step 508, a new TCP segment may be generated by aggregating at least a portion of a plurality of the collected TCP segments for the determined network flow. In step 510, the NIC 128 enables communication of the generated new TCP segment, new state information for the new TCP segment, and the state information for the transmitted TCP segments to the host system 124 for TCP offload.

Another embodiment of the invention may provide a machine-readable storage, having stored thereon, a computer program having at least one code section executable by a machine, thereby causing the machine to perform the steps as described above for transparent TCP offload with transmit and receive coupling.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing network information, the method comprising:
    collecting at least one received Transport Control Protocol (TCP) segment for a determined network flow by a network interface card (NIC);
    storing at said NIC, state information for said received TCP segment and state information for transmitted TCP segments for said determined network flow without transferring state information for said received TCP segment and said state information for said transmitted TCP segments to a host system communicatively coupled to said NIC;
    generating a new TCP segment comprising said collected at least one received TCP segment after a termination event occurs; and
    communicating said generated new TCP segment, new state information for said new TCP segment, and said state information for said transmitted TCP segments to said host system for TCP offload.

2. The method according to claim 1, comprising generating said new TCP segment by aggregating a plurality of said at least one received TCP segment for said determined network flow.

3. The method according to claim 1, comprising detecting at least one new received network flow based on detecting a set synchronous (SYN) flag in said at least one received TCP segment.

4. The method according to claim 1, wherein said generated new TCP segment comprises a same timestamp option as a first of said at least one received TCP segment.

5. The method according to claim 4, wherein a length of a generated TCP header for said generated new TCP segment is a sum of lengths of said collected at least one TCP segment.

6. The method according to claim 5, wherein a sequence number of said generated TCP header for said generated new TCP segment is same as a sequence number of first of said at least one received TCP segment.

7. The method according to claim 1, wherein said termination event occurs when at least one of the following occurs:
    a TCP/Internet Protocol (TCP/IP) frame associated with said determined network flow comprises a TCP flag with one or more of: a push (PSH) bit, a finish (FIN) bit, and/or a reset (RST) bit;
    a TCP/IP frame associated with said determined network flow comprises a TCP payload length that is equal to or greater than a maximum IP datagram size;
    a timer associated with said collecting of said at least one TCP segment expires;
    a new entry in a flow lookup table (FLT) is generated when said FLT is full;
    a first IP fragment associated with said determined network flow is received;
    a transmit window is modified;
    a change in a number of TCP acknowledgments (ACKS) is greater than or equal to an ACK threshold;
    a TCP/IP frame associated with said determined network flow comprises a selective TCP acknowledgment (SACK); and/or
    a TCP/IP frame associated with said determined network flow comprises a number of duplicated TCP acknowledgments that is equal to or greater than a duplicated ACK threshold.

8. The method according to claim 1, comprising classifying a state of said determined network flow as one of: an in order state, an out of order state, or an unknown state.

9. The method according to claim 8, comprising if a sequence number of at least one acknowledgement (ACK) packet is greater than an isle length of said collected at least one TCP segment, modifying said classified state of said determined network flow from said out of order state to said in order state.

10. The method according to claim 1, comprising initializing a state of said determined network flow to be an unknown state.

11. The method according to claim 10, comprising updating said initialized state based on said collected at least one TCP segment.

12. A system for processing network information, the system comprising:
>one or more circuits in a network interface card (NIC) that is operable to collect at least one received Transport Control Protocol (TCP) segment for a determined network flow;
>said one or more circuits are operable to store state information for said received TCP segment and state information for transmitted TCP segments for said determined network flow without transferring state information for said received TCP segment and said state information for said transmitted TCP segments to a host system communicatively coupled to said NIC;
>said one or more circuits are operable to generate a new TCP segment comprising said collected at least one received TCP segment after a termination event occurs; and
>said one or more circuits are operable to communicate said generated new TCP segment, new state information for said new TCP segment, and said state information for said transmitted TCP segments to said host system for TCP offload.

13. The system according to claim 12, wherein said one or more circuits are operable to generate said new TCP segment by aggregating a plurality of said at least one received TCP segment for said determined network flow.

14. The system according to claim 12, wherein said one or more circuits are operable to detect at least one new received network flow based on detecting a set synchronous (SYN) flag in said at least one received TCP segment.

15. The system according to claim 12, wherein said generated new TCP segment comprises a same timestamp option as a first of said at least one received TCP segment.

16. The system according to claim 15, wherein a length of said generated TCP header for said generated new TCP segment is a sum of lengths of said collected at least one TCP segment.

17. The system according to claim 16, wherein a sequence number of said generated TCP header for said generated new TCP segment is same as a sequence number of first of said at least one received TCP segment.

18. The system according to claim 12, wherein said termination event occurs when at least one of the following occurs:
>a TCP/Internet Protocol (TCP/IP) frame associated with said determined network flow comprises a TCP flag with one or more of: a push (PSH) bit, a finish (FIN) bit, and a reset (RST) bit;
>a TCP/IP frame associated with said determined network flow comprises a TCP payload length that is equal to or greater than a maximum IP datagram size;
>a timer associated with said collecting of said at least one TCP segment expires;
>a new entry in a flow lookup table (FLT) is generated when said FLT is full;
>a first IP fragment associated with said determined network flow is received;
>a transmit window is modified;
>a change in a number of TCP acknowledgments (ACKS) is greater than or equal to an ACK threshold;
>a TCP/IP frame associated with said determined network flow comprises a selective TCP acknowledgment (SACK); and/or
>a TCP/IP frame associated with said determined network flow comprises a number of duplicated TCP acknowledgments that is equal to or greater than a duplicated ACK threshold.

19. The system according to claim 12, wherein said one or more circuits are operable to classify a state of said determined network flow as one of: an in order state, an out of order state, or an unknown state.

20. The system according to claim 19, wherein said one or more circuits are operable to modify said classified state of said determined network flow from said out of order state to said in order state, if a sequence number of at least one acknowledgement (ACK) packet is greater than an isle length of said collected at least one TCP segment.

21. The system according to claim 12, wherein said one or more circuits are operable to initialize a state of said determined network flow to be an unknown state.

22. The system according to claim 21, wherein said one or more circuits are operable to update said initialized state based on said collected at least one TCP segment.

* * * * *